UNITED STATES PATENT OFFICE.

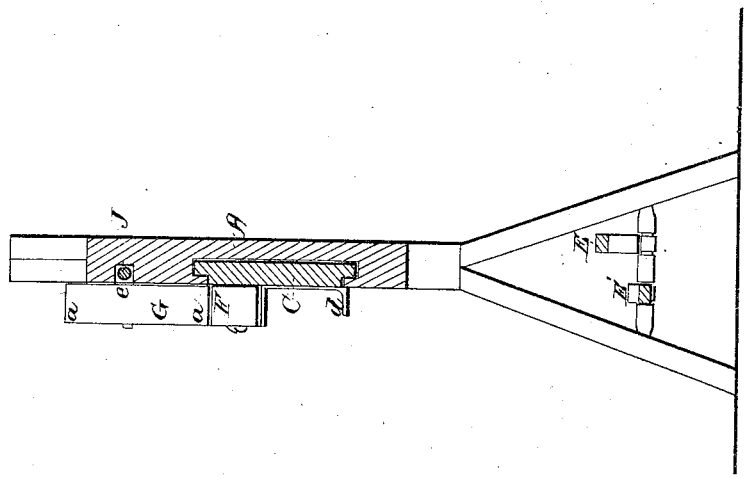
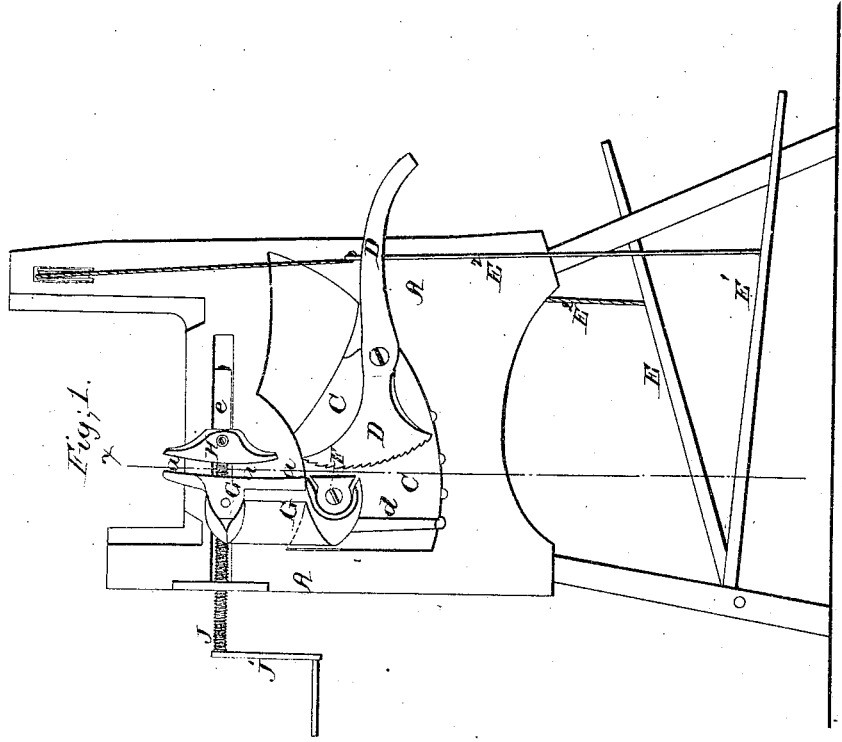

HENRY BARRINGER, OF WATAGA, ILLINOIS.

UPSETTING TIRES.

Specification of Letters Patent No. 28,728, dated June 19, 1860.

*To all whom it may concern:*

Be it known that I, HENRY BARRINGER, of Wataga, in the county of Knox and State of Illinois, have invented a new and Improved Tire-Upsetting Machine; and I do hereby declare that the following is a full, clear, and exact description thereof, reference being had to the accompanying drawings, making part of this specification, in which—

Figure 1 is a front-elevation of that portion of the tire-upsetting machine representing my improvement. Fig. 2 is a transverse, vertical section taken through Fig. 1 as indicated by the red line $x$ marked thereon.

Similar letters of reference indicate corresponding parts in both figures.

This invention and improvement in tire upsetting machines relates to the clamping of tires between movable jaws preparatory to the operation of upsetting or contracting the tire, which operation will be conducted in the manner described in my patent of July 8, 1856, the present claim being only to the setting and clamping of the tire in the machine.

To this end my invention consists in pivoting the lower clamping lever, that is to be operated by treadles, to a segment plate that moves in suitable guides in the framework of the machine; and in attaching one end of the bearing or clamping block to this plate in such a manner as to move with it, as will be hereinafter described; and in arranging in a sliding block, in such a relation to the clamping movable block, plate, and lever, that the machine may be adapted to tires of any diameter with great facility. The clamping devices are constructed in such a way that they may be rigidly fixed in any desirable position to which they may be adjusted, as will be hereinafter described.

To enable those skilled in the art to fully understand my invention I will proceed to describe its construction and operation.

The drawings represent only the lower portion of the machine, the upper clamping lever and shrinking plate being removed and only that portion of the machine is shown relating to the clamping and adjusting of such parts as hold the tire while it is upset or contracted, which form the subject of my present invention and improvement.

In the drawings A represents a solid frame, that is mounted on three legs, B, B, B, into which frame a circular recess is formed, and a movable segment C inserted into this recess and kept in place by a tongue and groove as shown in Fig. 2.

D is a clamping lever that has its fulcrum in the movable segment C, which lever is operated by treadles E, E′ and cord $E^2$ so as to bring its clamping surface up against the block F that is fixed into the vibrating portion G. This portion G has a curved surface $a$ against which the back or outside surface of the tire is placed to be clamped.

The block G$e$ is rigidly secured to the piece C and moves with this piece.

$d$ is a spring-latch that serves to lock the piece C to the frame A in any position in which it may be set.

H is a block with a curved face that is attached to a piece $e$ so as to leave a rocking movement that its surface may accommodate itself to the surface of the block G$e$ in whatever position this block may be placed; it is moved up to or from the block G by a screw J and crank handle J′. The object of this adjustable rocking-block H is to hold the tire against the block G and prevent it from "kinking" during the operation of upsetting or contracting the tire.

The tire to be shrunk is placed in the machine against the surface of block G, said block being adjusted in a proper position with relation to the movable shrinking clamp that is not shown in the drawings, and the clamping surface of the lever D is brought up hard against the tire so as to grip it firmly and hold it against the rocking-piece on the block G, the surface of which piece will accommodate itself to the surface of the tire as the clamping takes place. When the tire is clamped by this lever D, the segment having been properly adjusted, the rocking block H is brought up and made to hold the tire firmly so as to prevent it from bending or "kinking," the operation of upsetting is now conducted in the manner described in my present patent, aforesaid, and when the shrinking is completed, the lever D is relieved by moving the foot from the treadle E and pressing on the treadle E′ and screwing back the block H. Then another tire of a different size may be placed in the machine and its parts adjusted to the tire in a simple and efficient manner. Thus with one machine tires of any ordinary size may be upset or shrunk.

Having thus described my invention what I claim as new and desire to secure by Letters Patent is:

The combination of the movable segment, clamping lever D, rocking-piece F, block G and clamping-portion H when arranged in a manner to produce the result herein set forth.

HENRY BARRINGER.

Witnesses:
JOHN K. MALLONEE,
H. P. WOOD.